Aug. 4, 1959  R. T. BURNETT  2,897,921
BRAKE
Filed Nov. 16, 1953  3 Sheets-Sheet 1
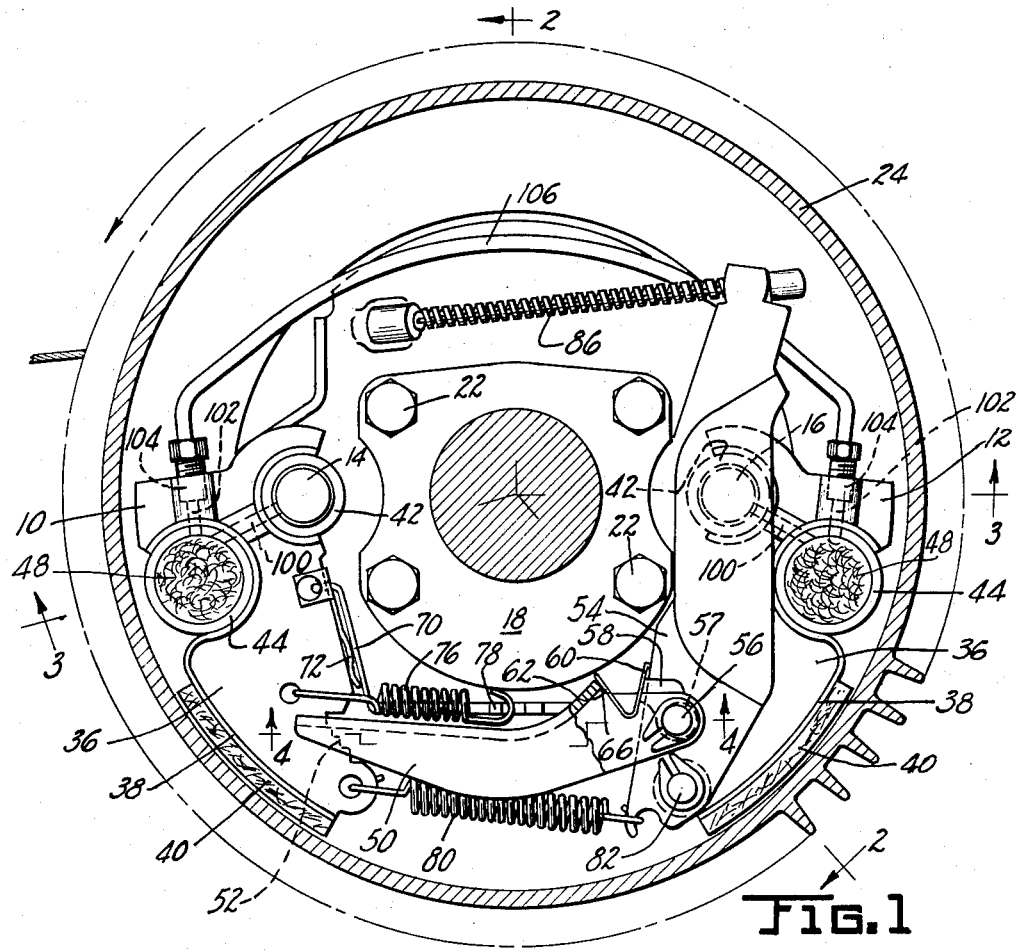
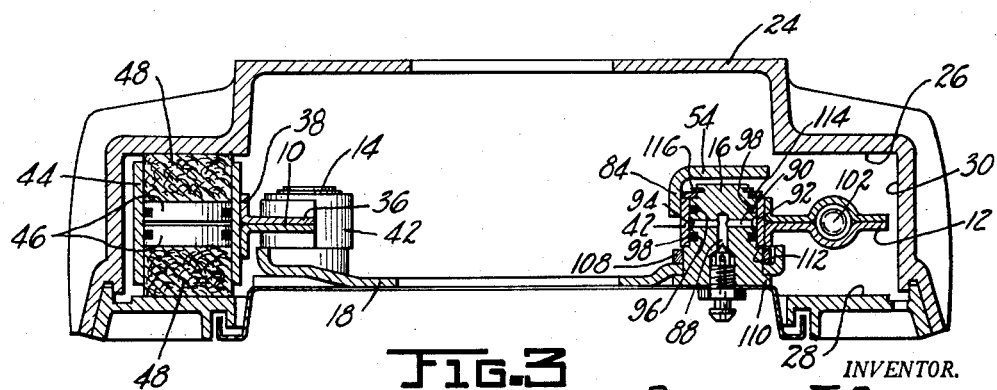
INVENTOR.
RICHARD T. BURNETT
BY Cecil J Arens
ATTORNEY Aug. 4, 1959        R. T. BURNETT        2,897,921
BRAKE
Filed Nov. 16, 1953        3 Sheets-Sheet 2

INVENTOR.
RICHARD T. BURNETT
BY Cecil E. Arera
ATTORNEY

Aug. 4, 1959  R. T. BURNETT  2,897,921
BRAKE
Filed Nov. 16, 1953  3 Sheets-Sheet 3
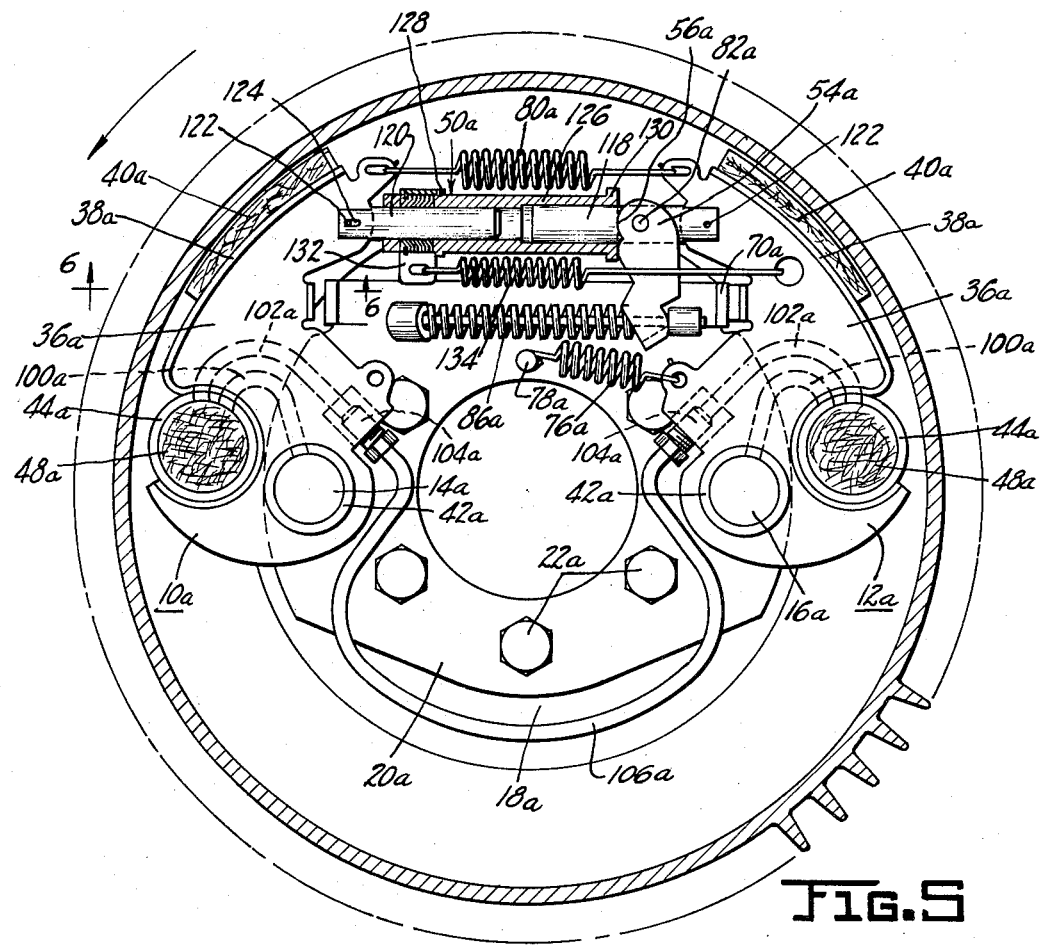
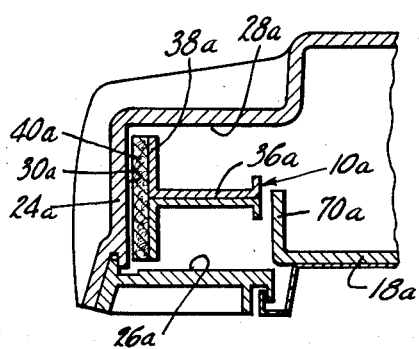
INVENTOR.
RICHARD T. BURNETT
BY
Cecil J Arens
ATTORNEY

United States Patent Office 2,897,921
Patented Aug. 4, 1959

2,897,921

BRAKE

Richard T. Burnett, South Bend, Ind., assignor to Bendix Aviation Corporation, South Bend, Ind., a corporation of Delaware Application November 16, 1953, Serial No. 392,177

31 Claims. (Cl. 188—70)

This invention relates to a brake having either or both of the following attributes: engagement of one friction means is brought about as the result of engagement of another friction means and/or a plurality of rotor surfaces are engaged by friction means associated with a single stator unit.

An important object of this invention is to combine in a single brake assembly the best operating features of disk and drum (or shoe) brakes, obtaining the self-energization inherent in certain types of drum brakes, while avoiding the loss of pedal travel which results from drum expansion in conventional drum brakes.

Another important object of this invention is to obtain improved heat dissipation from the brake elements, with a consequent significant reduction of "fade" (i.e. loss of brake effectiveness). This is accomplished primarily as a result of an appreciable increase in the swept rotor area, obtained by utilizing both disk and cylindrical friction areas.

Other advantages obtained by employing the present invention are: (a) increase of pedal ratio or decrease of pedal stroke made possible by reduced fluid displacement in the hydraulic actuator; (b) elimination of the need for initial brake adjustment; and (c) economical realization of the foregoing objects and advantages by means of a simple low-cost construction.

The present brake may be used at the rear wheels in a vehicle braking system in which the brake disclosed in copending application 369,197 is used at the front wheels.

When the brakes are applied during forward motion of a vehicle, the center of gravity shifts toward the front axle. This temporary shift in location of the center of gravity necessitates a greater amount of work in the form of kinetic energy absorption by the front wheel set of brakes. During braking in the reverse direction of vehicle motion, the center of gravity of the vehicle shifts toward the rear axle, necessitating a greater amount of kinetic energy absorption by the rear wheel brakes. The present invention provides braking the effectiveness of which depends upon the direction of movement of the vehicle. This brake may be outfitted on the rear set of wheel brakes and arranged so that the brakes are more effective for braking the vehicle in reverse, and conversely the front wheel set of brakes are more effective in forward braking. The principle underlying this arrangement of braking units is that the set of brakes having the greater amount of work to do will correspondingly have a greater capacity to do work.

With the present invention the friction elements of the brake may be applied by auxiliary mechanical means for parking or emergency purposes.

Another feature of the invention relates to automatic adjustment of one of the friction elements. It is my aim to provide a force transmitting member which will communicate supplementary applying effort on one of the units during braking with reverse vehicle motion thus augmenting the effectiveness of the brake. The force transmitting means also serves to adjust the friction element of one of the units during braking with forward vehicle motion. Thus the single member is adapted to perform two distinct operations which makes for economy in number of parts of the brake.

The above and other objects and features of the present invention will appear more fully hereinafter from a consideration of the following description, taken in connection with the accompanying drawings, wherein a plurality of embodiments of the invention are illustrated by way of example.

In the drawings:

Figure 1 is a view looking in from the hub end of Figure 2 with the hub removed and a portion of the drum cut away.

Figure 3 is a section view taken on the line 3—3 of Figure 1;

Figure 5 is a side elevation of a second embodiment of my invention illustrated with the automatic adjustor in section; and, Figure 6 is a section view taken on the line 6—6 of Figure 5 passing through the anchor of one of the units.

Figure 2:
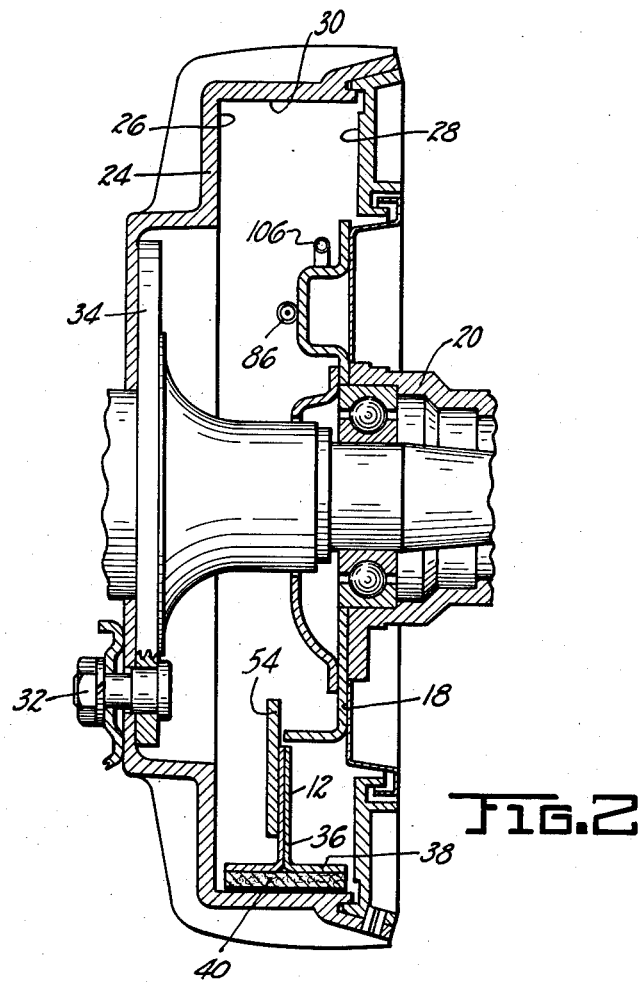
Figure 2 is a section view taken on the line 2—2 of Figure 1.

Referring to the embodiment shown in Figures 1–4, a pair of friction units designated generally by reference numerals 10 and 12 are pivotally mounted on anchor members 14 and 16 respectively, which are secured to a support member 18 fastened to a non-rotatable member, such as axle housing 20, by a plurality of fastening members 22.

The friction units 10 and 12 are adapted for engagement with a rotatable member 24 having axially spaced disk friction surfaces 26 and 28, joined by a substantially cylindrical internal friction surface 30. The rotatable member 24 is secured by a plurality of fastening members 32 to a rotatable member such as axle flange 34.

The two friction units 10 and 12 are of identical construction. The following description of one of the units applies equally to both. The friction unit 10 includes a web portion 36 and rim 38 having friction material lining 40 secured thereto in any suitable manner. The web and the friction material lined rim form a "shoe" portion of the unit 10 and will hereinafter be referred to as such. Perpendicularly mounted in the web 36 are a sleeve 42 and a cylinder 44, the sleeve 42 serving as a pivotal mounting for the friction unit 10 and the cylinder providing a housing for piston members 46. The pistons are reciprocably mounted in the cylinder 44 for axial movement in opposite directions. The remote ends of the pistons 46 are equipped with friction material lining 48 adapted to frictionally engage the axially spaced disk surfaces 26 and 28 when the pistons are spread.

Operatively interconnecting the two units 10 and 12 is a U-shaped cross section strut 50 having one end bearing against a stepped portion 52 of unit 10 and pivotally connected on the other end to lever 54 by pin 56 which passes through opening 57 of larger diameter than the pin to provide lost motion therebetween. This lost motion is necessary to prevent over adjustment for lining wear.

A leaf spring 58 is interposed between the strut 50 and the applying lever 54 so that opposing legs 60 and 62 of the spring engage one side of the applying lever and the strut respectively rotating the lever against the sleeve 42 and the strut against the stepped section 52 of the web 36. Leg 62 is loaded to the position shown in Figure 1 where it engages the strut at point 66.

Figure 4:
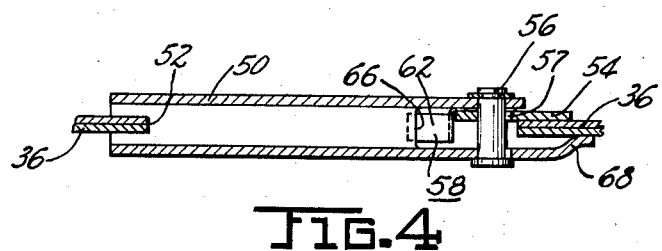
Figure 4 is a section taken on the line 4—4 of Figure 1, illustrating in greater detail the construction of the interconnecting strut.

Referring to Figure 4, both ends of the strut 50 are bifurcated to straddle the webs 36 of units 10 and 12. The right hand portion of the strut extends on both sides of applying lever 54. One of the furcations 68 is axially offset to engage web 36 of unit 12 thereby laterally stabilizing the operative positions of the strut 50 and applying lever 54.

Associated with unit 10 is a second anchoring member 70 in the form of a struck up portion integral with the support 18. The engagement of unit 10 with this second anchoring means 70 defines the retracted position of the "shoe" portion thereof. Interposed between the web 36 of unit 10 and anchoring means 70 is a leaf spring 72 provided with a clip portion for retaining it in place. The function of the leaf spring 72 is to dampen the rate of return of the unit 10 to anchored and/or retracted position thereby preventing objectionable noises.

Helical spring 76 has one end connected to the unit 10 and the other end fastened to a laterally extending projection 78 of the support 18 for yieldably urging the "shoe" portion of unit 10 to retracted position. The retracted position of the "shoe" portion of unit 12 is defined by engagement of strut 50 with the stepped portion 52 of unit 10 and since this point of engagement is varied, the retracted position of the "shoe" portion of unit 12 is also varied depending upon the extent of wear of lining 40 on unit 12. This retracted position is automatically varied so that the clearance between lining 40 of unit 12 with the cylindrical surface of engagement 30 is maintained substantially constant. The manner in which this result is accomplished will be seen more clearly from a consideration of the operation of the brake following later in this description.

Yieldably retaining the "shoe" portion of unit 12 in retracted position is helical spring 80 connected at one end to web 36 of unit 10 and at the opposite end to the lower end of lever 54. The lever 54 is pivotally carried on the unit 12 by a pin connection 82. It will be noted that the amount of pivotal action permitted of the unit 12 is determined by the abutment of strut 50 with the stepped portion 52 of the unit 10 and the contact relationship of transverse flange 84 of the lever 54 with sleeve 42.

Lever 54 is adapted to mechanically apply the shoe portions of units 10 and 12. The transverse strengthening flange 84 of the lever 54 extends along a portion of its length and bears against sleeve 42 in released position of the lever. The lever is connected at its upper end with a cable 86 adapted to cause rotation of the lever which fulcrums on pinned connections with unit 12 and strut 50, transmitting through the pinned connections actuating force producing opposite pivotal actuation of the units 10 and 12 so that the shoe portions thereof are radially outwardly applied against the cylindrical surface 30 of rotor 24.

Anchor members 14 and 16 are adapted to form a part of the hydraulic system in addition to serving as torque taking means. Therefore, each of the anchors 14 and 16 is provided with a centrally located passage 88 extending longitudinally through the anchor and terminating in radially extending passages 90 which open into a chamber 92, defined by a part of the sleeve 42 and an annular channel 94 located in the circumference of the anchor members. The anchor members 14 and 16 are each equipped with two longitudinally spaced annular grooves 96 formed therein to retain sealing members 98 on either side of the channel 94 making the chamber 92 a fluid tight chamber.

The chamber 92 and cylinder 44 are connected to a pressure creating device, not shown, via the anchor member 14 which provides an inlet to the hydraulic system of each brake. Hydraulic fluid leaves the system via anchor 16. Two hydraulic conduits 100 and 102 are formed in the webs 36 of each of the units 10 and 12. The conduit 100 provides fluid communication between chamber 92 and cylinder 44, and the conduit 102 connects the cylinder 44 with port 104. An external conduit 106 interconnects the ports 104 of the units 10 and 12.

Each of the anchors 14 and 16 is secured to the support by a bushing 108 which is press fitted over the anchor and hydrogen brazed, clamping the support 18 between an annular flange 110 and the bushing 108. The friction unit is then assembled onto the anchor bearing against shoulder 112 and retained in operative position by annulus 114 which contacts one end of the sleeve 42 and is maintained in position by a snap ring 116 received on the outer end of the anchor.

In the description of Figures 5 and 6 which follows, all parts of the brake assembly corresponding to those already described are identified by the same reference numeral with the subscript *a* affixed thereto.

Friction units 10a and 12a are pivotally mounted on anchor members 14a and 16a carried at diametrically opposite points on a support member 18a which in turn is secured to a non-rotatable member such as axle housing 20a by fastening members 22a.

The friction units 10a and 12a each include a web portion 36a and rim 38a having friction material lining 40a secured thereto. The web and friction material lined rim form a "shoe" portion of the unit and will hereafter be referred to as such. Perpendicularly mounted in the web 36a are sleeve 42a and cylinder 44a. Reciprocably received in cylinder 44a are a pair of axially-reciprocable, oppositely-acting piston members having friction material facing 48a.

The anchor members 14a and 16a are identically constructed. They are adapted to form a part of the hydraulic system for each brake as in the preceding embodiment besides serving as torque taking members. The anchors are affixed to the support in a suitable manner, such as that previously described; the units 10a and 12a are then pivotally received thereon.

The hydraulic system for actuating the brake includes anchor 14a, into which the fluid pressure is introduced, conduits 100a and 102a, formed integral with the web 36a of the friction unit to provide hydraulic communication to and exit from the cylinder 44a wherein pistons 46a are reciprocably mounted for actuation in opposite directions, and an external conduit 106a, interconnecting two ports 104a located at the periphery of the two units. The introduction of fluid under pressure to these parts effects simultaneously the same spreading effect on the pistons received in each of the units.

In its retracted position the shoe of unit 12a engages a projection 70a integral with the support member to thereby provide anchoring means for said shoe. A helical spring 76a has its ends connected to the unit 12a and post 78a respectively to yieldably retain the shoe in retracted position.

A force transmitting means designated generally by reference numeral 50a interconnects the two units 10a and 12a. As will be understood more fully from a consideration of the operation of the device this force transmitting means carries the reaction torque from one of the units to the shoe portion of the other unit in one direction of vehicle motion thus providing additional servo action for the latter unit. The force transmitting means 50a includes plungers 118 and 120 connected to the webs 36a of the units by pins 122.

An oblong opening 124 in web 36a of friction unit 10a, through which the pin 122 is received, provides lost motion for determining the clearance of the shoe portion of unit 10a from applied position.

Plungers 118 and 120 are slidably received in a sleeve 126 which is provided with spaced annular flanges 128 and 130. Clip 132, encircling sleeve 126 and bearing against flange 128 is connected to unit 12a by a spring 134 thereby urging the flange 130 into contact with an applying lever 54a which is pivotally connected to plunger 118 by means of a pin 82a.

Spring 80a, fastened between the two units 10a and 12a, yieldably retains the shoe portion of unit 10a in retracted position determined by abutment of web 36a with plunger 120. The plunger 120 is free to travel in one direction only by reason of a one-way clutch mechanism associated therewith. The retracted position of the shoe is thus automatically varied to compensate for wear of lining 40a so that the clearance of the shoe portion of unit 10a from applied position remains substantially constant throughout the wear life of the brake unit.

The applying lever 54a has one end connected to a cable 86a adapted to produce pivotal movement of the lever which fulcrums at 56a and 82a causing opposite pivotal actuation of the units thereby radially outwardly applying the shoe portions thereof. The units may thus be mechanically applied to provide parking braking.

As shown in Figure 5 the two friction units are identically constructed which makes for economy of production and eliminates the necessity of fabricating "right hand" and "left hand" units.

Operation of the embodiment shown in Figures 1 to 4 is as follows: Fluid pressure from a master cylinder source, not shown, is transmitted through an inlet port 89 in anchor member 14 and the centrally located passage 88 to the chamber 92 and thence to cylinder 44 in friction unit 10 by way of conduit 100. External conduit 106 transmits fluid pressure between the two units thereby imparting the same actuating pressure to unit 12 as exists in unit 10. The fluid pressure in cylinder 44 spreads the two pairs of axially reciprocable pistons 46 into engagement with the disk surfaces 26 and 28 of the rotatable member 24.

Assuming forward motion of the vehicle with drum rotation in the direction of the arrow indicated in Figure 1, the engagement of lining 48 on each of the pairs of pistons with disk surfaces 26 and 28 will tend to pivot each friction unit in a counterclockwise direction about its associated anchoring members 14 and 16. Counterclockwise actuation of unit 10 produces radially inward actuation of the shoe portion thereof; the extent of counterclockwise pivotal actuation of unit 10 is limited by engagement of web 36 with the anchor 70. The braking effort of unit 10 consists of that produced by pistons 46. The anchoring load from this braking effort is distributed between anchoring means 14 and 70.

Counterclockwise actuation of unit 12 produced by pistons 46 causes radially outward actuation of the shoe portion, applying it against surface 30 of the rotating member 24. The anchoring load for this combination of disk and shoe braking is taken by anchor 16. As the shoe portion of unit 12 is actuated to applied position, the bottom portion of lever 54 is moved toward the right; this movement of the lever causes shifting of strut 50 in the same direction as lever 54 since the two members are connected by the pin 56. If this shifting movement of strut 50 is sufficient (as determined by the extent of clearance of the shoe portion of unit 12 from applied position) it is caused to rotate slightly about pin 56 under the action of spring 58 and thereby assumes a different point of engagement with stepped contacting surface 52 of unit 10. This new position of the contacting point between strut 50 and unit 10 produces increments of adjustment by which the retracted position of the shoe portion of unit 12 is moved successively outwardly according to extent of wear of lining 40 on unit 12. Thus the clearance of the shoe portion of unit 12 from applied position remains substantially constant.

When the brake is released, the shoe portion of unit 10 is already in retracted position; spring 80 produces clockwise movement of the unit 12 about anchor 16 causing release of the shoe portion thereof from applied position. The retracted position of the shoe portion of unit 12 is determined by the extent of clockwise pivotal actuation of the unit established by contact of strut 50 with unit 10.

From a consideration of the braking effort of both units for braking in forward direction of vehicle motion, it is seen that one unit supplies disk braking and the second a combination of disk and shoe braking.

Assuming now backward or reverse movement of the vehicle so that drum rotation is opposite to that indicated by the arrow, engagement of the lining 48 of pistons 46 in each of the units will cause clockwise movement of units 10 and 12 about anchor members 14 and 16.

The clockwise actuation of unit 12 caused by engagement of pistons 46 with surfaces 26 and 28 produces a turning moment resulting in a force which is transmitted to strut 50 via lever 54; the strut transmits this force to unit 10 supplementing the applying effort of the piston elements therein on the shoe portion of unit 10. In other words, by reason of this interconnection of the two units the extent of pivotal actuation of unit 12 in a clockwise direction is limited only by the applied position of the shoe portion of unit 10 during braking with reverse direction of vehicle motion. The torque reaction from disk braking of unit 12 is distributed between anchor 16 and the pin connection 82. From a consideration of the two units as a combination it will be seen that torque reaction from the braking of both units is distributed between anchors 14 and 16.

Braking effectiveness of the two units during reverse vehicle motion is greater than braking effectiveness with forward direction of vehicle motion. In forward the one unit supplies a combination of disk and shoe braking, the other unit supplies disk braking only. But with reverse vehicle motion the applying effort exerted on the shoe element of one of the units is supplemented by the torque reaction from disk braking of the other unit. The over-all braking effectiveness is thus made to depend upon direction of motion to be impeded, and for this reason the vehicle is provided with brakes which by proper orientation may compensate for change of center of gravity previously mentioned.

It will be noted that no automatic adjustment is provided for the shoe portion of unit 10. The reason for this is that the shoe portion of this unit is applied only during braking with reverse vehicle motion. The relatively lower frequency in number of stops and reduced magnitude of speeds encountered makes the rate of wear of the shoe portion much less than that associated with the other unit, therefore, there is little need for automatic adjustment.

The operation of the embodiment shown in Figures 5 to 7 is substantially the same as that of the preceding embodiment and is as follows: Assuming a braking application with the vehicle in forward motion and drum rotation in the direction indicated in Figure 5, anchor 70a associated with unit 12a coacts with anchor 16a so that no applying force is transmitted to unit 10a through force transmitting means 50a. It will be noted that at this time the braking effort is applied by the disk and disk-applied shoe for unit 10a and disk only for unit 12a.

In this direction of drum rotation, pivotal actuation of unit 10a causes plunger 120 to move toward the left, and one-way clutch mechanism 134 automatically adjusts the retracted position of the shoe portion thereof to compensate for effect of wear of lining 40a of unit 10a.

During braking with drum rotation in the direction opposite from that indicated (that is, for reverse direction of vehicle motion) engagement of the facing 48a on the pistons 46a in each of the units 10a and 12a causes clockwise pivotal actuation thereof. Torque reaction from the disk braking of unit 10a introduces a force which is transmitted by means 50a to unit 12a supplementing the applying effort exerted by the pistons in unit 12a on the shoe portion thereof. In other words, the extent of pivotal actuation of unit 10a produced by disk braking is limited only by the applied position of the shoe portion of unit 12a. The braking effort of the two units for this direction of drum rotation is disk and disk-applied shoe braking for unit 12a and disk braking only for the unit 10a, the applying effort for shoe braking in this instance however is supplied by the torque reaction from disk braking of both units.

When the operator releases applying effort, return spring 76a urges the shoe portion of unit 12a to retracted position; spring 80a urges the shoe portion of unit 10a to retracted position.

Although only two embodiments of my invention have been shown and described it will be understood by those skilled in the art that the objects of this invention may be attained by the use of constructions different in certain respects from those disclosed without departing from the underlying principles of the invention.

I claim:

1. For use in combination with a rotatable member having three friction element engaging surfaces, a brake assembly comprising a support member, a pair of oppositely located anchoring means secured to said support member, a first and a second brake unit pivotally associated with said anchoring means, each of said brake units including a mounting portion, a shoe portion, and oppositely actuated disk elements located radially intermediate said mounting and shoe portions and adapted to produce pivotal actuation of said brake unit about said anchoring means, an applying lever having a pinned connection with said second brake unit and pivotal thereon, a strut interconnecting said applying lever and said first brake unit, said strut having a pinned connection with said applying lever permitting pivotal movement of said lever thereon, a stepped connection between said strut and first brake unit enabling successive increments of adjustment of the shoe portion of said second brake unit according to extent of wear of the lining thereon, a second anchoring means associated with said first brake unit limiting extent of pivotal actuation of said first brake unit and defining retracted position of the shoe portion thereof, means yieldably retaining the shoe portion of said first unit in retracted position, and resilient means interconnecting said first unit and applying lever for urging the shoe portion of said second unit to retracted position, said strut being adapted to transmit braking torque of said second unit to apply the shoe portion of said first unit during braking in one direction of rotation, said applying lever being arranged for movement about said pinned connections fulcruming respectively thereon to apply the shoe portions of each of said units.

2. A kinetic energy absorbing device comprising a support member, a pair of spaced anchoring means, a brake unit pivotally associated with each of said anchoring means, said brake unit including a radially actuated shoe element and axially actuated friction elements adapted to produce pivotal actuation of the shoe element as a torque reaction from their application, said pivotal actuation of the shoe element being radially outward into engagement with a rotatable member or radially inward depending upon the direction of motion during braking, said units being arranged to produce opposite direction of radial application of the shoe elements associated therewith, means interconnecting said units including an automatic adjustor for varying the retracted position of at least one of the shoe elements of said units, said interconnecting means being further arranged to transmit torque reaction from application of friction elements of one of said units to cooperably apply the shoe portion of the other of said units, fixed means associated with one of said units limiting the extent of pivotal actuation thereof in a manner preventing transmittance of torque reaction between the units, resilient means for yieldably retaining the shoe elements of said units in retracted position, and means for mechanically applying the shoe portions of said units including a lever pivotally mounted on said interconnecting means and fulcruming thereon to cause opposite pivotal actuation of said units thereby applying the shoe portions thereof.

3. In cooperation with a rotatable member having three friction element engaging surfaces, a brake assembly comprising a support member, a pair of oppositely located first anchoring means, a brake unit pivotally associated with each of said anchoring means, means for hydraulically actuating said brake unit including axially reciprocable friction elements adapted to engage said rotatable member in a manner producing pivotal actuation of the brake unit thereby radially applying a shoe portion thereof, each of said units being arranged to alternately produce shoe braking depending upon the direction of rotation to be impeded, fixed means associated with one of said units limiting the extent of pivotal actuation of the unit associated therewith in one direction of rotation, force transmitting means interconnecting said units whereby extent of pivotal actuation of the other of said units is limited only by applied position of the shoe portion of said one unit in opposite direction of rotation, automatic adjusting means associated with said force transmitting means for determining the retracted position of the shoe portion of one of said units, and means for mechanically actuating said units including a lever fulcruming on said force transmitting means and one of said units in a manner producing opposite pivotal actuation of said units to radially outwardly apply the shoe portions thereof.

4. For use in combination with a rotatable member having three friction element engaging surfaces, a support member, a pair of oppositely located anchoring means, a composite disk and shoe brake unit pivotally associated with each of said anchoring means, a second anchoring means associated with one of said units, an applying lever pivotally secured to the other of said units, a strut operatively interconnecting said brake units for applying the shoe portion of one of said units in one direction of rotation of said rotatable member, a pinned connection of said lever with said strut and other brake unit, said second anchoring means limiting the pivotal actuation of said one brake unit in a manner preventing transmittance of force through said strut in the opposite direction of rotation of said rotatable member, automatic adjusting means operable in said opposite direction of drum rotation and adapted to define the retracted position of the shoe portion of said one unit, and resilient means associated with each of said brake units for urging the respective shoe portions thereof to retracted position, said applying lever adapted to fulcrum about either of pinned connections with said strut and said other brake unit thereby producing opposite pivotal actuation of said units and mechanically applying the shoe portions thereof against a surface of the rotatable member.

5. In cooperation with a rotatable drum having three friction element engaging surfaces, a brake assembly including a support member, a pair of spaced first anchoring means, a brake unit pivotally associated with each of said first anchoring means, a hydraulically actuated friction element associated with each of said brake units and adapted to produce pivotal actuation thereof, a second friction element associated with each of said units adapted to be radially applied by the pivotal actuation of said unit, said units being arranged so that the second friction element of only one of said units is applied in each direction of drum rotation, fixed means defining the retracted position of the second friction element of one of said units, said fixed means further serving to cooperate with said first anchoring means in providing torque reaction during braking in one direction of drum rotation, force transmitting means interconnecting said units enabling torque reaction from engagement of the first friction elements of one of said units to apply the second friction element of the other of said units in the opposite direction of rotation, and means for yieldably urging the second friction element of each of said units to retracted position defined by engagement of said units with said fixed means and force transmitting means.

6. A kinetic energy absorbing device having braking effectiveness dependent upon the direction of vehicle motion to be impeded and comprising a support member, two brake units pivotally mounted at spaced points along the periphery of said supporting member and including axially actuated friction elements and radially actuated friction elements, said radially actuated friction elements being outwardly applied against a rotatable drum during braking in one direction of vehicle motion and urged radially inwardly to retracted position during braking in opposite direction of vehicle motion, the direction of radial movement of said second friction elements in said brake units being oppositely affected by direction of vehicle motion to be impeded, shiftable force transmitting means operatively interconnecting said units whereby torque reaction from application of friction elements of one unit may be imparted to the other of said units for cooperably applying the radially actuated portion thereof, fixed means associated with one of said units limiting the extent of pivotal actuation thereof in a manner preventing torque reaction transmittance to the other of said units, and means for yieldably urging the radially actuated portions of said units to retracted position.

7. A brake assembly comprising a rotor having three friction element engaging surfaces, a support member, a pair of anchoring means secured to said support member, a pair of composite disk and shoe brake units each pivoted on one of said anchoring means, said brake units including axially reciprocable friction elements adapted for engagement with two of the surfaces of said rotor, the engagement of said friction elements with said rotor tending to cause pivotal movement of said units which causes engagement of the shoe portion of one of them with the third surface of the rotor in one direction of rotation and causes engagement of the shoe portion of the other with the third surface of the rotor in the other direction of rotation, a lever pivotally associated with the first of said units, a strut interconnecting the lever and the second of said units adapted to control the spacing between the units, and an additional anchoring means associated with the second unit, said strut being adapted to transmit applying force from the axially reciprocable friction elements of the first unit to the second unit, and said additional anchoring means preventing transmission of applying force from the axially reciprocable friction elements of the second unit to the first unit.

8. In a brake, a rotatable element having plane and cylindrical braking surfaces, a first braking device having pivotal movement to establish frictional contact with said cylindrical braking surface and provided with means actuable into frictional contact with said plane braking surface to cause said device to pivot, a second braking device having pivotal movement to establish frictional contact with said cylindrical braking surface and provided with means actuable into frictional contact with said plane braking surface to cause said second device to pivot, said devices being so arranged with respect to the cylindrical braking surface that for a given direction of rotation of said element actuation of said means for the respective devices causes one of the devices to pivot toward the cylindrical braking surface and the other to pivot away from said surface, a force transmitting member interconnecting said devices to increase the brake applying force of one of said devices for one direction of rotation of said element, and means for preventing such an increase in brake applying force to the other of said devices for the opposite direction of rotation of said element.

9. A kinetic energy absorbing device comprising a support member, a pair of spaced anchoring means, and a brake unit pivotally associated with each of said anchoring means, said brake unit including a shoe portion and axially reciprocable friction elements radially intermediate said anchoring means and shoe portion, said shoe portion being radially outwardly applied against a portion of a rotatable member or radially inwardly urged to retracted position as a torque reaction from engagement of said friction elements with a rotatable member, the direction of radial actuation of said shoe portion depending upon the direction of vehicle motion during braking, said units being arranged for opposite direction of radial actuation of said shoe portions, a strut interconnecting said units whereby torque reaction from the friction elements of one of said brake units may be transmitted to the other of said units to cooperably apply the shoe portion thereof during braking in one direction of vehicle motion, and fixed means limiting extent of pivotal actuation of said other unit in opposite direction of vehicle motion.

10. For use in combination with a rotatable member, a brake assembly comprising a support member, a pair of oppositely located first anchoring means, a composite disk and shoe brake unit pivotally associated with each of said anchoring means, force transmitting means interconnecting said units so that actuation of one of said units imparts an actuating force to the other unit in one direction of rotation of said rotatable member, fixed means limiting the pivotal actuation of said other unit in the opposite direction of rotation of said rotatable member, means for mechanically applying the shoe portions of said units including an applying lever interconnected with one of said units and said force transmitting means so that movement of said lever causes opposite pivotal actuation of said brake units in a manner radially outwardly applying the shoe portions thereof, and resilient means for retaining the shoe portions of said units in retracted positions defined by engagement of said units with said fixed means and force transmitting means.

11. A kinetic energy absorbing device comprising a pair of spaced anchor members, a composite disk and shoe brake unit pivotally associated with each of said anchor members, each of said units including axially reciprocable friction elements adapted to produce radially outward application of a portion of said unit during braking in one direction of rotation, the radial direction of actuation of said units being oppositely affected by forward and reverse vehicle motion, means interconnecting said units whereby torque reaction from the application of the axially reciprocable friction elements of one of said units may be transmitted to the other of said units to cooperably apply a portion thereof, means for limiting the radially inward pivotal movement of one of said units, and automatic adjusting means forming a part of said interconnecting means whereby the retracted position of one of said units will vary as a function of lining wear thereon.

12. A brake, the effectiveness of which depends upon the direction of drum rotation during braking, comprising a pair of composite disk-and-shoe brake units, a first anchoring means associated with both of said units, a second anchoring means associated with one of said units, and a strut interconnecting said units whereby braking torque of said units in one direction of rotation is distributed between said first anchoring means associated with said units, said second anchoring means being associated with one of said units to sever transmittance of force through said strut in the opposite direction of drum rotation in such a manner that braking torque is distributed through said first anchoring means associated with both of said units and said second anchoring means associated with one of said units.

13. In a brake, a rotatable element provided with angularly related braking surfaces, a first braking device pivotally arranged for frictional engagement with one of the braking surfaces of said element, means carried by said device and actuable into frictional engagement with the other of the braking surfaces of said element, frictional engagement of said other braking surface by said means causing said device to pivot, a second braking device arranged for pivotal movement and equipped with means actuable into frictional engagement with at least one of said braking surfaces, and force transmitting means interconnecting said devices in such a way that pivotal movement of said second braking device causes pivotal movement of said first braking device, actuation of said means associated with said second braking device developing a torque therein which is applied through said force transmitting means to the first braking device.

14. A pair of brake units each including disk elements adapted to produce pivotal movement of said unit, and a shoe brake element of each of said units radially actuated by pivotal movement of said units, said units being arranged so that the shoe brake element of only one of said units is applied in each direction of vehicle motion, force transmitting means interconnecting said units whereby torque reaction from application of the disk elements of one of said units may be communicated to the other of said units to supplement applying effort on the shoe brake element during braking in one direction of vehicle motion, and fixed means intercepting transmittance of torque reaction through said force transmitting means during braking in opposite direction of vehicle motion.

15. A pair of composite disk and shoe brake units, each of said units including disk elements adapted to produce pivotal movement of said unit and a radially applied shoe brake element actuated by pivotal movement of said unit, the direction of radial actuation of said shoe brake element being dependent upon the direction of vehicle motion to be impeded, said units being arranged so that the shoe brake element of only one of said units is applied in each direction of vehicle motion, and force transmitting means interconnecting said units whereby reaction from application of the disk elements of one of said units may be communicated to the other of said units for supplementing the applying effort on the shoe brake portion thereof.

16. A brake comprising a support member, a pair of oppositely located friction units having shoe portions pivotally actuated by axially reciprocable friction elements associated therewith, the direction of pivotal actuation of the shoe portions of said units depending upon the direction of motion to be impeded, the direction of radial actuation of the shoe portions of said units being opposite for braking in either direction of drum rotation, force transmitting means interconnecting said units whereby torque reaction from the application of the friction elements of one of said units cooperably applies the shoe portion of the other of said units, and fixed means associated with said other unit to limit the extent of pivotal actuation thereof.

17. A brake comprising a pair of friction units pivotally associated with a pair of spaced first anchoring means, said friction units including axially movable friction elements and a radially actuated shoe portion applied as a torque reaction from engagement of said friction elements, means interconnecting said units whereby the extent of radially inward movement of the shoe portion of one of said units is defined by the applied position of the shoe portion of the other of said units, and a second anchoring means associated with one of said units defining the extent of radially inward movement of the shoe portion thereof by engagement with said second anchoring means.

18. A brake comprising a pair of oppositely located friction units, a first anchoring means associated with each of said friction units, each of said friction units being adapted to deliver disk and shoe braking in one direction of vehicle motion and disk braking only in the opposite direction of vehicle motion, a strut interconnecting said units whereby the extent of pivotal actuation of one of said units is limited only by the applied position of the shoe portion of the other of said units, and fixed means intercepting transmittance of force through said strut in the opposite direction of vehicle motion.

19. In a brake, a rotatable element having plane and cylindrical braking surfaces, a first braking device having pivotal movement to establish frictional contact with said cylindrical braking surface and provided with means actuable into frictional contact with said plane braking surface to cause said device to pivot, a second braking device having pivotal movement and provided with means actuable into frictional contact with said plane braking surface to cause said second device to pivot, a force transmitting member interconnecting said devices, and means operatively connecting both of said devices to pivot the same into frictional contact with said cylindrical surface.

20. In a brake, a rotatable element having plane and cylindrical braking surfaces, a first braking device having pivotal movement to establish frictional contact with said cylindrical braking surface and provided with means actuable into frictional contact with said plane braking surface to cause said device to pivot, a second braking device having pivotal movement and provided with means actuable into frictional contact with said plane braking surface to cause said second device to pivot, and brake adjustor means connecting said devices.

21. A pair of composite disk-and-shoe brake units, force transmitting means interconnecting said units to communicate torque reaction therebetween thereby supplementing the applying effort on the shoe portion of one of said units during braking in one direction of vehicle motion, fixed means severing transmittance of force between said units during braking in opposite direction of vehicle motion, and automatic adjusting means operable in said opposite direction of vehicle motion to vary the retracted position of the shoe portion of one of said units.

22. In a brake, a pair of friction units, each of said friction units including axially movable friction elements and a radially applied shoe element actuated by pivotal movement of said units produced from reaction of engagement of said axially movable friction elements with a rotatable member, the direction of radial movement of the shoe portion of said units being oppositely affected by the direction of motion of the rotatable member to supply shoe braking by only one of said units in each direction of rotation of the rotatable member.

23. A brake comprising a pair of composite disk and shoe brake units, a pair of spaced anchoring means associated with said units, a second anchoring means associated with one of said units, and means interconnecting said units whereby torque reaction from their application will be distributed between said pair of spaced anchoring means, said second anchoring means intercepting torque transmittance between said units during braking in forward direction of vehicle motion thereby distributing torque reaction from the application of said units between said first and second anchoring means.

24. A pair of composite disk-and-shoe brake units, means for transmitting torque reaction from one of said units to the other for applying the shoe portion thereof in braking reverse motion of the vehicle, means intercepting transmittance of torque between said units in braking forward motion of the vehicle, and means for mechanically applying the shoe portions of said units fulcruming on operative connections with said units whereby movement of said applying means is adapted to produce opposite pivotal actuation of said units applying the shoe portions of both of said units.

25. In a brake, a rotatable element having plane and cylindrical braking surfaces, a first braking device having pivotal movement to establish frictional contact with said cylindrical braking surface and provided with means actuable into frictional contact with said plane braking surface to cause said device to pivot, a second braking device having pivotal movement and provided with means actuable into frictional contact with said plane braking surface to cause said second device to pivot, and a force transmitting member interconnecting said devices to communicate applying force therebetween.

26. A brake comprising a pair of spaced friction units having axially movable friction elements and a radially outwardly applied shoe portion, means interconnecting said units whereby torque reaction may be transmitted therebetween to cooperably apply the shoe portion of one of said units for braking the vehicle in reverse motion, means associated with one of said units for intercepting torque transmitted through said first mentioned means during braking of the vehicle in forward motion.

27. A brake comprising a rotor, a pair of composite disk and shoe brake units adapted to furnish a combination of disk and shoe braking in each direction of rotor rotation, each of said units being pivotally mounted on an axis parallel to the axis of rotation of said rotor in such a way that application of the disk friction elements causes pivotal movement of the unit to apply the shoe friction element thereof, said units being further arranged relative to each other in a manner providing shoe braking of one unit only in each direction of rotor rotation, force transmitting means interconnecting said units in such a way that torque reaction from the disk braking of one of said units is communicated to the other of said units for supplying additional applying effort to the shoe portion of said second mentioned unit during braking of said rotor in one direction of rotation, and fixed means associated with one of said units intercepting in the other direction of rotor rotation the transmittance of torque reaction through said force transmitting means interconnecting said units.

28. For use in braking a rotor mounted for both clockwise and counterclockwise rotation about an axis, a brake comprising first and second friction units each mounted for pivotal movement about an axis parallel to the axis of said rotor, each of said friction units including friction elements axially movable into engagement with said rotor along a line parallel to the axis of said rotor to cause said unit to pivot and a shoe friction element adapted for movement both radially inward and outward relative to the axis of said rotor when the unit pivots, radially outward movement of said shoe elements applying said elements into engagement with said rotor, engagement of said axially movable friction elements of said first unit causing clockwise pivotal movement of said first unit and radially outward movement of the shoe element thereof when said rotor is rotating clockwise, engagement of said axially movable friction elements of said second unit causing clockwise pivotal movement of said second unit and radially inward movement of said shoe element thereof when said rotor is rotating clockwise, and means interconnecting said units for translating the torque reaction from clockwise pivotal movement of said second unit into additional torque applied to said first unit to supplement the braking force of the shoe element of said first unit.

29. In a brake, a rotor, first and second disk and shoe brake devices, each mounted for pivotal movement about an axis parallel to the axis of rotation of said rotor, means for engaging the disk friction elements of each of said devices with said rotor thereby causing the devices to pivot and apply the shoe element of only one of said devices, means interconnecting said devices whereby torque reaction from engagement of the disk friction elements of said first brake device is communicated to the second brake device for applying the shoe portion of said second device during braking of one direction of rotor rotation, and fixed means intercepting the transmittance of torque reaction from said second device to said first device during braking in the other direction of rotor rotation.

30. In a kinetic energy-absorbing device, a pair of friction units, each of said friction units including oppositely applied first friction means and second friction means radially applied by a turning force developed from application of said first friction means, force transmitting means operably connected to said friction units for transmitting torque reaction from one of said units to the second friction means of the other of said units, and means associated with the other of said units for preventing transmittal of torque reaction from said other unit to the second friction means of said one unit.

31. In a kinetic energy-absorbing device, a pair of friction units having a first friction means which is radially applied and oppositely acting second friction means which are utilized to produce the radial application of said first means, means interconnecting said units whereby torque reaction may be transmitted therebetween to cooperably apply the first friction means of one of said units during braking in one direction of vehicle motion, and means associated with one of said units for preventing transmittal of torque reaction through said interconnecting means during braking in the opposite direction of vehicle motion.

References Cited in the file of this patent

UNITED STATES PATENTS

| | | |
|---|---|---|
| 2,352,222 | Poque et al. | June 27, 1944 |
| 2,751,046 | Tack | June 19, 1956 |